Aug. 10, 1943.   H. J. SHAFER   2,326,398
PISTON VALVE
Filed Oct. 17, 1941   2 Sheets-Sheet 1
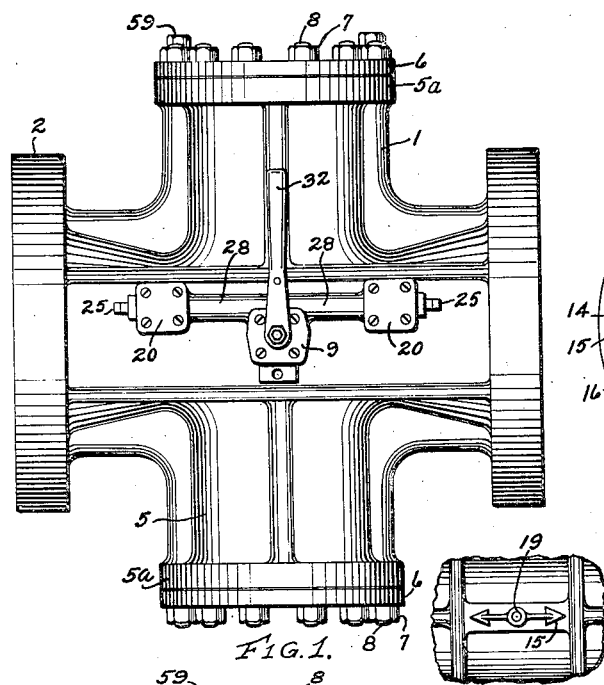
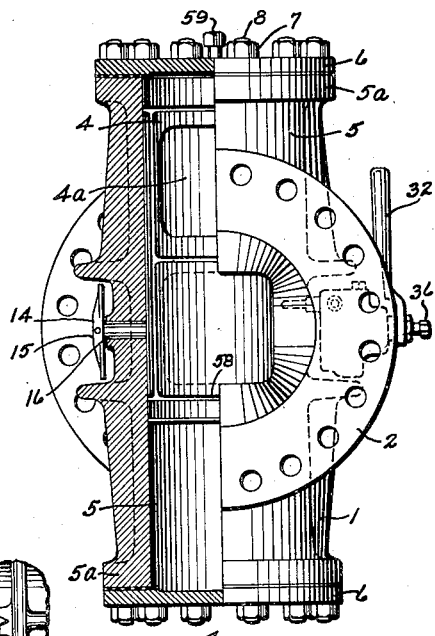
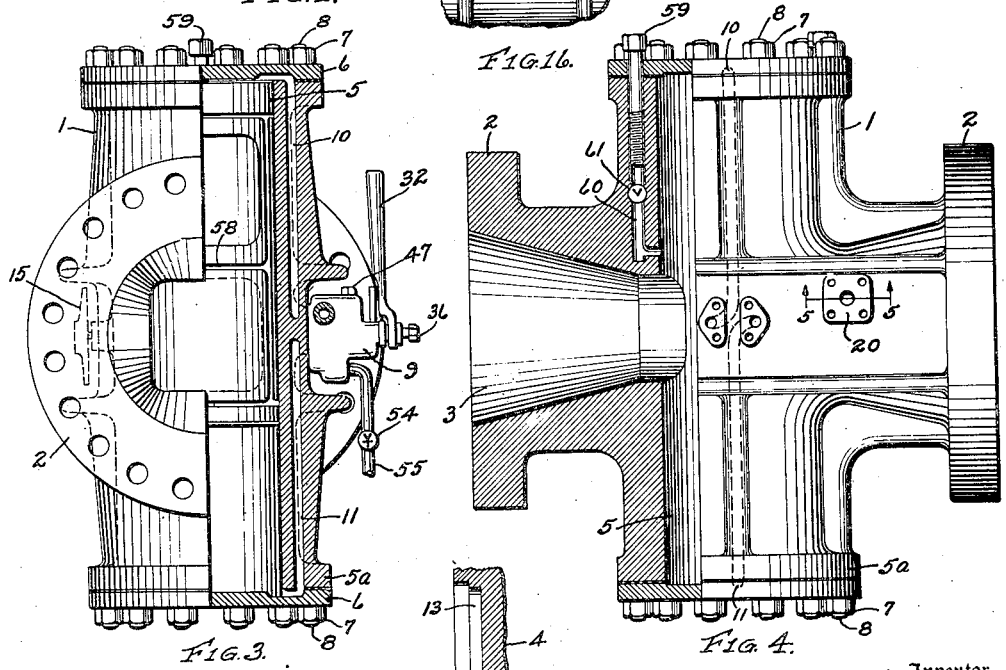
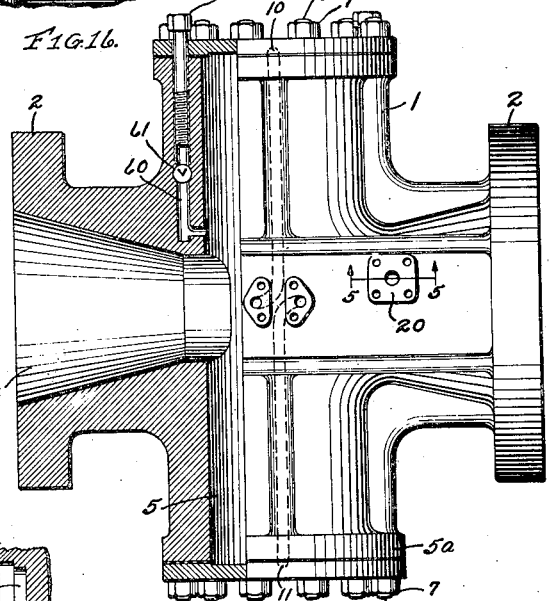
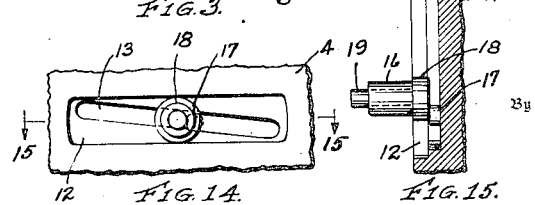
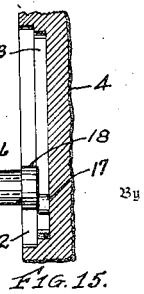
Inventor
HOMER J. SHAFER
By Alfred F. Rees
Attorney Aug. 10, 1943.   H. J. SHAFER   2,326,398
PISTON VALVE
Filed Oct. 17, 1941   2 Sheets-Sheet 2
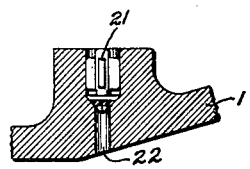
FIG. 5.
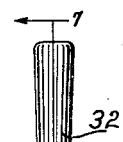
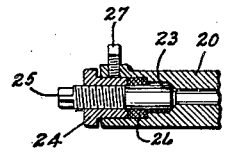
FIG. 8.
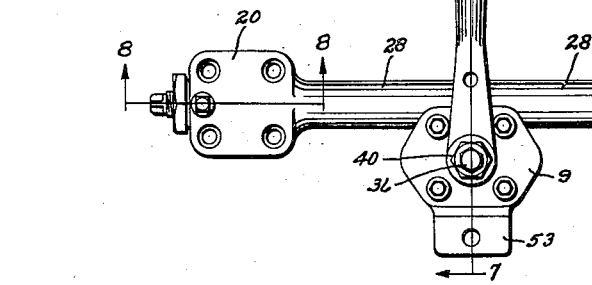
FIG. 6.
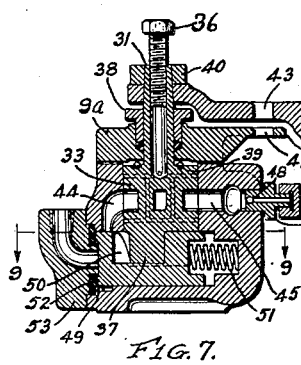
FIG. 7.
FIG. 13.
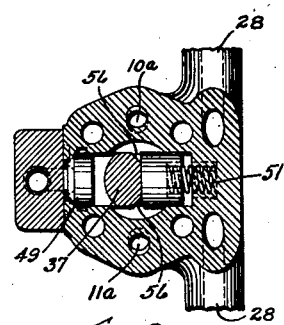
FIG. 9.
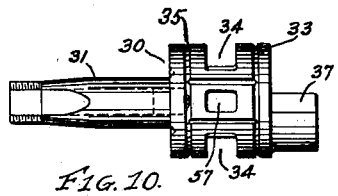
FIG. 10.
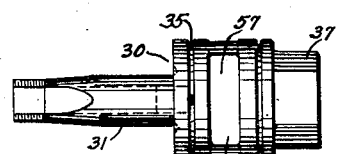
FIG. 11.
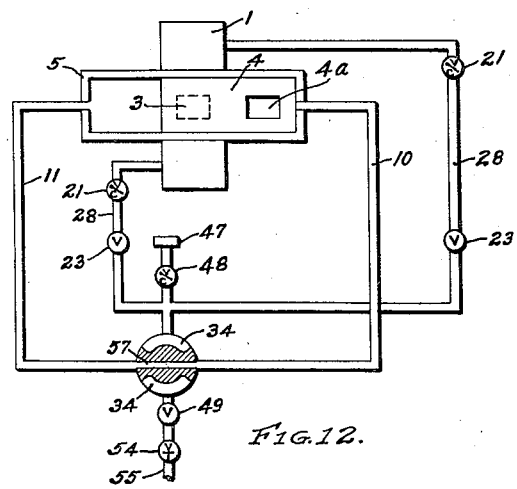
FIG. 12.
Inventor
HOMER J. SHAFER
By
Attorney Patented Aug. 10, 1943

2,326,398

UNITED STATES PATENT OFFICE 2,326,398

PISTON VALVE

Homer J. Shafer, Mansfield, Ohio, assignor to The Ohio Brass Company, Mansfield, Ohio, a corporation of New Jersey Application October 17, 1941, Serial No. 415,357

13 Claims. (Cl. 137—139)

This invention relates to fluid valves of the piston type and in its more specific aspects relates to an improved control for opening and closing a piston type valve.

The object of this invention is to construct a simplified control for a piston type valve.

Another object of the invention is to construct a piston valve control that neutralizes the pressure on the piston when it is at rest and is capable of reversely moving the valve piston from an open to a closed position and vice versa.

A further object of the invention is to provide a piston valve control in which the pilot valve has means therein to definitely provide for neutralization of the pressures on opposite ends of the piston through the pilot valve itself following each adjustment of the valve piston.

A still further object of the invention is to provide an improved and simplified signal device to indicate whether the piston valve is in an open or a closed position.

Another and still further object of the invention is to provide an improved indicator device that is rotated in response to the reciprocation of the piston and will indicate the open or closed position of the valve.

Another and still further object of the invention is to provide a construction in which the movement of the indicator is initiated by the action of a cam or eccentric engaging a cam track disposed in the piston wall of the valve piston.

A still further object of the invention is to incorporate check valves in the supply lines of the pilot control to prevent an escape of pressure fluid during certain periods of adjustment of the main valve under the control of said pilot valve.

Another and still further object of the invention is to provide a pilot control for a piston valve that releases the pressure in the control cylinder by means of a cam on said pilot valve engaging a valve adapted to open one end of the cylinder to the atmosphere as the piston is being shifted in the piston valve cylinder.

Another and still further object of the invention is to provide a pilot valve control that will simultaneously open one end of the valve cylinder to the atmosphere while pressure fluid is admitted to the opposite end of the cylinder and which valve will seal the exhaust against leakage during periods of time when the piston valve is at rest to permit neutralization of the pressures on opposite ends of the piston.

Other and further objects of the invention will occur to those skilled in the arts to which this invention pertains as the description proceeds which taken in connection with the accompanying drawings sets forth the preferred embodiment thereof but such disclosure is not to be construed as a limitation of the invention which is limited only by the appended claims and any and all modifications, alterations and variations of structure coming within the spirit and scope thereof are deemed to be included herein.

In the drawings:

Fig. 1 shows a general plan view of the piston valve arrangement constituting the subject matter of the invention.

Fig. 2 is a view partly in section looking at the left end of Fig. 1 showing details of the indicator mechanism.

Fig. 3 is a view partly in section looking from the left of Fig. 1 showing certain details of the valve control.

Fig. 4 is a partly in section view looking from above on Figs. 1 and 2, showing certain details of construction.

Fig. 5 is a sectional view taken along the line 5—5 of Fig. 4.

Fig. 6 is an enlarged plan view of the valve mechanism shown in Fig. 1.

Fig. 7 is a sectional view taken along the line 6—6 of Fig. 6.

Fig. 8 is a sectional view taken along the line 8—8 of Fig. 6.

Fig. 9 is a view of the valve operating mechanism taken substantially along the line 9—9 of Fig. 7.

Fig. 10 is a side elevational view of the plug valve shown in Fig. 7.

Fig. 11 is another side elevational view of the device shown in Fig. 10.

Fig. 12 shows a circuit diagram of the controls of the device in Fig. 1.

Fig. 13 shows an end view of the exhaust shut-off valve of Figs. 6 and 9.

Fig. 14 shows a general plan view of the indicator cam track in the piston of Fig. 2.

Fig. 15 shows a sectional view substantially along the line 15—15 of Fig. 14.

Fig. 16 is a section of the valve body looking at the left of Figs. 2 and 3 showing a plan view of the pointer.

The pressure fluid transmission lines currently, widely in use, such as employed in the petroleum and natural gas arts as well as in related arts, require control valves of considerable size to isolate or control different portions of the lines and which because of their size require considerable energy to open and close. Various expedients occur in the art for opening and closing these valves, all of which find utility in the several fields but are so large and cumbersome and difficult of operation that some means must be provided other than manual to open and close the several valves. Various auxiliary devices, such as pressure tanks, etc., have been utilized to shift these valves but owing to the infrequent occasions upon which these valves are opened and closed, loss of pressures are frequently encountered which render it difficult to open and close them after long periods of rest in either a closed or an open position. The instant invention provides a valve construction in which the pressures from the upstream or downstream side of the line are utilized to shift the piston valve from an open to a closed position or vice versa which incorporates suitable and novel indicator mechanism to inform the operator of the condition of the valve. Since the principal source of pressure fluid for the shifting of this valve to open and close same is derived from the main conducting pipe line, it is entirely conceivable that at times it may be desirable to open or close the valve when there is no pressure on either side of the valve and a simple provision has been made whereby a small portable source of pressure may be applied to shift the valve from one position to the other and thereby accomplish the results desired by the operator. This auxiliary supply is controllable by the same valve that selectively applies line pressure fluid to the valve piston to open and close same as well as permitting all other advantageous controls for the manipulation of the valve.

The embodiment of applicant's device is contained in the several views of the drawings in which I indicates the valve body having a restricted orifice or passageway 3 therein extending between the flanges 2, 2 and providing a Venturi effect to assist in the manipulation or shifting of the valve piston 4 slideably mounted in the cylinder 5. The cylinder 5 is disposed transversely of the passageway 3 in the valve body. The piston 4 has a passageway 4a therein which corresponds in shape to the restricted dimensions of passageway 3 and is adapted to register therewith when the valve is open. The other end of the piston 4 is solid or imperforate and is adapted to close passageway 3 when in registry therewith. The ends of the cylinder are closed by means of cylinder heads or closures 6 applied to the flanged ends 5a of cylinder 5 and are secured thereto by a plurality of appropriate securing elements. These securing elements comprise studs 8 to which nuts 7 are applied and a suitable packing or gasket is customarily disposed between the head 6 and flanged end 5a of the cylinder 5 as is well known in the art.

The piston 4 is reciprocally mounted in the cylinder portion of the valve body I and is generally of a cylindrical construction having the rectangular throat or bore 4a for the transmission of pressure fluid as previously described. The cylinder is provided with lubricant grooves which may be of the type generally disclosed in copending application Serial No. 377,060, filed February 1, 1941, in order to prevent leakage of pressure fluid past the cylinder and to, also, facilitate its movement therein. The source of pressure fluid for the movement of the piston 4 is derived from the pipe lines that are secured to the flanges 2, 2 and is controlled by means of a reversing or pilot valve 9 arranged in housing to be subsequently described. The pressure fluid derived initially from the pipe lines is introduced into the ends of the cylinder by means of passageways or conduits 10 and 11 that are formed in the walls of the cylinder as more particularly shown in Fig. 3 and as indicated in the dotted lines of Fig. 4. Each of these conduits 10 and 11 is joined to appropriate grooves or apertures formed in the cylinder heads 6, 6 such that the pressure fluid may be admitted to the ends of the cylinder for reciprocating the piston therein such that the valve passageway therein may be closed or opened at the election of the operator. Fig. 2 shows the piston in the position wherein the valve is closed.

Owing to the fact that it is not possible for the operator to personally observe the position of the piston 4 within the cylinder 5, external means has been provided for indicating the position of the valve piston. Formed into the wall of the piston are two slots or cam tracks 12 and 13, the former of which is disposed longitudinally of the wall of the piston and the other of which is disposed diagonally to and within the slot 12. Rotatably supported in the walls of the cylinder 5 and observable from the exterior is an indicator generally defined by numeral 14 comprising a shaft 19 that is rotatably mounted in a sleeve 16, the sleeve 16 being held against rotation and appropriately flanged so as to hold it in a fixed position in the wall of cylinder 5. The pointer 15 comprises a pointed bar member secured to shaft 19 and rotatable through 90 degrees and which in the position shown in Fig. 2 indicates that the valve is closed and when 90 degrees disposed therefrom, as shown in Fig. 16, informs the operator that the valve is open. Rotation is imparted to pointer 15 and shaft 19 by means of an eccentric or cam 17 that is fixed to a collar or disk element 18 rigidly secured to the shaft 19. The collar 18 is adapted to snugly fit into the channel or groove 12 and the portion 17 which is eccentrically disposed on the collar 18 cooperates with and is engageable in the diagonal slot or cam track 13. It should be apparent that upon reciprocation of the piston 4 within the cylinder 5 that the cam or eccentric 17 slideable in the slot or groove 13 will, by reason of the eccentric disposition thereof relative to the shaft 19 and collar 18, rotate said shaft 19 and collar 18 and thereby the pointer 15 will inform the operator of the position of the valve piston 4. It is obvious from the foregoing that the grooves or channels 12 and 13 must be so proportioned and shaped that the shaft 19 and pointer 15 will rotate through 90 degrees when the valve piston is moved from an open to a closed position. Suitable means may, if necessary, be provided to prevent rotation of piston 4 relative to the passageway 3 in cylinder 5.

It was pointed out above that channels 10 and 11 formed in the walls of the cylinder housing conduct pressure fluid derived from the source of supply to the ends of the cylinder as indicated to move the valve piston 4 from one end of the cylinder to the other to thereby shutoff or open the port 3 and prevent or allow the conduction of pressure fluid flowing in the conduit or pipes attached to the flanges 2, 2. This source of pressure fluid is derived from the aforementioned conduit connected to the flanges 2, 2 and is led into housings 20, 20 that are secured to the valve body I by a plurality of appropriate screw mechanisms. Each of these housings in effect supports and holds a pair of valves only one of which, 21 is shown in Fig. 5 and is in the nature of a check valve, the seat of which is formed in the valve body 1 as more clearly indicated in said figure and is an elemental form of a check valve, namely, that it allows the flow of pressure fluid in the one direction and prevents the reverse flow of pressure fluid. The closing or opening of this valve is governed entirely by the application of pressure fluid to one or the other end thereof. Conduit or bore 22 is formed into the wall of the valve body and connects directly with the opening or passageway 3 formed in the valve body. Since there are two of these valves, that is, one in each end of the valve housing, it is obvious that pressure fluid may flow through each of the respective ports 22 toward the control valve mechanism 9 that is arranged substantially midway between the two housings 20, as shown. An additional valve 23 is provided in each housing 20 that is manually actuated and is intended to serve only as a check upon valve 21 or as a stop valve in the event the valve 20 should fail for one reason or another. The valve 23 is a simple screw actuated device that seats in a beveled portion of the housing 20 and has a stuffing box 24 arranged therein into which the valve stem 25 is threadably secured. The stuffing or packing 26 is placed as indicated and a locking screw 27 provided as shown in order to hold the stuffing box 24 in an adjusted position. Valve 23 is in a normally open condition and is intended only as an emergency valve in the event there should be a failure of operation in the valve 21 and may be employed to isolate one end of valve body 1 from the control to be subsequently described.

Pressure fluid is conducted to the control valve mechanism 9 by conduits 28 that extend between the housings 20, 20; the conduits being preferably integrally associated with housings 20, 20; and valve 9. The control valve housing 9 has a rotatable plug element 30, functioning as a reversing or pilot element therein to direct pressure fluid coming from either of the housings 20 and applying it selectively to the ends of the cylinder 5. Valve element 30 shown in greater detail in Figs. 10 and 11 comprises a stem 31 to which a handle 32 is secured for the purpose of rotating the valve stem 31 and is further provided with a central body or plug member 33 that has arranged therein a pair of surface channels 34, 34 for the purposes of conducting the pressure fluid to the aforementioned ends of the cylinder 5 from either of the conduits 28, 28 to either of conduits 10 or 11. The valve is further provided with a plurality of grease grooves 35 circumferentially as well as longitudinally disposed thereon and adapted to be filled with grease admitted through the bore or opening in valve stem 31 and into which the grease feeding element 36 is arranged that forces the lubricant into the channels and thereby prevents or reduces to a minimum the leakage of pressure fluid about the valve plug 33 as shown. The valve plug is further provided with a cam element 37, the function of which will be hereinafter more specifically set forth. The valve plug 33 is retained in position in the valve body 9 by means of a closure element 9a that is removably secured to the valve body 9 and has therein a stuffing box 38 that encloses a packing element as shown and to facilitate the rotational movement of the valve stem and its plug an anti-friction bearing 39 is disposed about the valve stem that takes up the normal upward thrust of the valve against the closure element 9a. Another element 40 secured to the end of the valve stem 31 retains the handle 32 in position. The closure element 9a has an ear 41 formed thereon provided with an opening 42 that is axially aligned with an opening 43 in the handle 32 which serves the purpose of permitting some form of a lock to be applied thereto such that a possible accidental movement of the handle 32 will be prevented. The conduit passageways in the connecting conduits 28, 28 terminate in a pair of openings 44 and 45 formed in the valve housing 9 and which terminal openings are disposed substantially diametrically of the aperture in which the valve plug 33 rotates. From this, it is apparent that as the valve 30 and its plug 33 and the stem 31 is rotated one of the channels 34 will selectively admit pressure fluid to the apertures 10a and 11a connecting with conduits 10 and 11 that lead to the ends of the cylinder 5 and provide the source of power to move the piston 4 as previously described.

In the event that there should be a failure of pressure fluid passing through the conduit attached to the flanges 2, then some auxiliary pressure fluid supply may be applied to the valve body 9 which through the plug element 46 secured therein having a closure 47 thereon and enclosing a check valve 48 which will allow the passage of pressure fluid in one direction only; that is, pressure fluid will be allowed to pass the valve but will prevent the exhaustion of the pressure fluid therefrom. The closure element 47 is normally placed on the insert or plug 46 and is only removed at such times as it becomes necessary to apply pressure fluid thereto from an exterior source.

Means have been provided in this particular mechanism to control the exhaust of the pressure fluid from the ends of the cylinder 5 to the atmosphere and comprises a valve member 49 that is slideably mounted in an appropriate bore arranged in the lower end of the valve housing 9. The valve 49 has an opening or slot 50 therein which is adapted to receive the cam 37 integrally associated with the valve plug 33 of valve rotor 30, which cam is adapted to move the valve 49 axially of the bore in housing 9. The valve 49 is kept in a normally closed position by means of a spring 51 arranged in the valve housing 9 as particularly shown in Figs. 7 and 9. Fig. 13 shows the end elevation or view of the valve 49 in more detail which end shows a valve seat engaging ridge integrally formed thereon that engages a more or less resilient valve seat 52 disposed at the end of the valve 49 and held in position by means of a closure 53 provided with an opening therein leading to the atmosphere for the purpose of exhausting the pressure fluid selectively from the ends of the cylinder 5. There may be instances in which the unit pressure of the pressure fluid supplied to the valve in housing 9 may be so great as to move the piston 4 at an abnormally high rate of speed and this rapid movement is checked by means of a throttle valve 54 (Figs. 3 and 12) disposed in conduit 55 secured to the exhaust opening formed in the closure 53. By thus arranging the throttle valve the movement of the piston 4 may be regulated to any speed desired and prevent any possible damage occurring to any portion of the valve cylinder or the piston.

The cam 37 is so proportioned and shaped that upon rotation of the valve stem 31 by the handle 32 it will move through perhaps 10 degrees to either side of its neutral position before any motion is imposed upon the valve 49. This is a safety feature enabling the operator to move the handle 32 under an absolutely controlled condition and he will note at which point pressure fluid begins to exhaust from cylinder 5. It will thereby prevent any unintentional application of pressure fluid to the ends of the cylinder 5 under any and all conditions. A close inspection of Fig. 9 shows that the cam 37 is provided with two faces 56, 56 against which a shoulder portion of valve 49 fits in either direction of rotation of the cam 37 to indicate a fully open condition of valve 49.

The control of the pressure fluid in the cylinder 5 includes a neutralizing means such that when the handle 32 is in its central position as shown in Figs. 1 and 7, there will be a balance of pressures on both ends of the cylinder 5 and thereby prevent any possible motion or creepage of the piston 4 in either direction in the cylinder 5 that might be caused by leakage of pressure fluid from either end of the valve body 1. This neutralizing media takes the form of a conduit 57 or opening along the diameter of the valve plug 33 although external means could also be employed. The functioning of this opening or conduit 57 is more clearly shown in Fig. 12 in which the conduit leading from the valve to the ends of the cylinder 5 are shown as connected together by means of the conduit 57 and that enables the high pressure on the one side of the piston to be neutralized against the other end of the piston 4. Simultaneously, as is evident from the disclosure in Fig. 12, there is a positive locking of the source of pressure fluid supply derived from the principal conduit connected to the flanges 2 to further assist in preventing any accidental movement of the piston 4 in the cylinder 5.

Means have been provided to force lubricant into the lubricant grooves 58 of piston 4 which is provided with such an arrangement as has been more specifically set forth above. The aforementioned grooves are adapted to be operably connected with a conduit or bore 60 formed in the walls of cylinder 5 and is adapted to receive appropriate lubricant that is forced into the aforementioned grooves by means of a screw mechanism 59. This lubricant and its function are more fully set forth in the aforementioned application. To prevent the reverse flow of lubricant a valve 61, schematically illustrated in Fig. 4, may be provided.

The operation of the device may be most easily ascertained by an inspection of Fig. 12. Assume that pressure fluid is admitted to the conduit 28 connected to the upper portion of valve housing 1 then the check valve 21 in the opposite conduit will be closed or in the event of its failure stop valve 23 in the same line may be closed. When it is desired to move the piston 4 to the opposite end of cylinder 5, the valve 57 is rotated such that the upper channel 34 of the valve plug 33 connects conduit 28 with conduit 10, whereupon cam 37 opens valve 49 and the other channel 34 connects conduit 11 to the atmosphere through conduit 55 and throttle valve 54. The reverse motion of the piston 4 is accomplished by connecting the opposite end of the cylinder to the same conduit 28 in which pressure fluid is supplied and reversely moving the valve 30. Following each adjustment valve rotor 30 is restored to a neutral position whereupon passage or conduit 57 connects the ends of cylinder 5 to neutralize pressures in the piston 4 or place it in pressure equilibrium. Attention is invited to the fact that the pilot valve lubricant channels at no time register with the valve portions under even extreme positions of adjustment and that these in combination with the lubricant supplied to the grease grooves in piston 4 provide an absolutely tight seal and prevent possible leakage of pressure fluid whether supplied from an external source or from the conduit connected to the valve body.

There has thus been provided a control for a piston valve which enables the operator to definitely control the movement of the piston and that also provides a simple indicating mechanism disposed in a protected position on the valve body 1, that has means for locking the pilot or reversing valve in a neutral position for neutralizing the pressure on opposite ends of the cylinder all of which combine to give an operator a quick, easy and simplified method of shifting the valve piston 4 from an open to a closed position and of indicating to him the exact position of the valve as it moves from one end of the cylinder to the other.

That which is considered new and novel and useful and which is sought to be protected by the Letters Patent of the United States is as follows:

I claim:

1. In valve control mechanism; a valve body having a cylinder therein; a piston reciprocably mounted in said cylinder, said piston adapted to open and close said valve; and means to move said piston in said cylinder comprising conduits connected to each end of said valve body, a check valve in each of said conduits, a reversing valve connected between said conduits, conduits connecting said valve to said cylinder, means to neutralize the pressures in said piston when said reversing valve is in a neutral position, means to exhaust pressure fluid from one end of said cylinder, a check valve in said exhaust controllable from said reversing valve and means to throttle said exhaust.

2. In a valve control; a valve body connectable between pressure fluid conducting conduits; a cylinder incorporated in said valve body; a piston reciprocably mounted in said cylinder and adapted to open and close said valve as it is reciprocated in said cylinder; conduits connected to said pressure fluid conducting ends of the valve; a first check valve in each of said conduits; a reversing valve to which each of said conduits is connected; conduits connecting said reversing valve and said cylinder; conduit means to exhaust pressure fluid from said cylinder connected to said reversing valve; a second check valve in said exhaust to close said exhaust conduit; means to open and close said second valve; means to throttle said exhaust; and means to neutralize the pressures in said piston when said reversing valve is in a neutral position comprising a bore diametrically disposed of said reversing valve.

3. In a valve; a valve body adapted to be connected to pressure fluid conducting conduits; a cylinder transversely disposed of said conduits; a piston in said cylinder adapted to open or close said valve; means to reciprocate said piston by pressure fluid selectively derived from said conduits which includes, a first pair of conduits connected to said pressure fluid conducting conduits and connected to a reversing valve, a check valve in each of said first pair of conduits, a second pair of conduits connecting said reversing valve to said cylinder, means to control the exhaust from said cylinder, means to throttle said exhaust, means to neutralize the pressure on said piston when said reversing valve is in a neutral position and means to introduce an auxiliary pressure fluid supply to said cylinder through said reversing valve.

4. In a piston type valve; pressure fluid operated means to shift said piston to open or close same, said pressure fluid derived from conduits connected to said valve; a reversing valve to selectively direct said pressure fluid to opposite ends of said piston; a check valve in each of said conduits; an exhaust valve to open and close an exhaust port associated with said reversing valve; means to open and close said exhaust valve; means to throttle said exhaust; and means to neutralize the pressures on said piston when said reversing valve is in a neutral position.

5. In a piston valve control mechanism; a first set of conduits connected to opposite ends of a cylinder in which a valve piston is mounted; a reversing valve connected to said conduits; a second set of conduits including a pressure actuated check valve in each conduit connecting said reversing valve to a source of pressure fluid supply derived from the line in which said piston valve is connected; an exhaust conduit associated with said reversing valve; an exhaust valve for said exhaust conduit; means to actuate said exhaust valve; and means to neutralize the pressures in said piston when said reversing valve is in a neutral position.

6. In a reversing valve; a housing supporting a reversing valve; bearing means in said housing to take up thrust on said valve; an exhaust valve in said reversing housing, means eccentrically disposed on said reversing valve to shift said exhaust valve transversely of the axis of said reversing valve; means to keep said exhaust valve normally closed; a handle to rotate said reversing valve; and means axially disposed of said reversing valve to force lubricant about said reversing valve.

7. In a reversing valve mechanism; a housing for said valve; a reversing valve rotatably mounted in said housing; an exhaust valve slideably mounted in said housing; a handle to rotate said reversing valve; and a cam means eccentrically associated with said reversing valve axially thereof and engaging said exhaust valve to open said exhaust valve as said reversing valve is rotated.

8. In a compound valve mechanism; a housing enclosing a reversing valve; means to rotate said reversing valve in said housing; an exhaust valve enclosed in said housing; means on said reversing valve to axially shift said exhaust valve when said reversing valve is rotated; said reversing valve having a port therein adapted when in a neutral position to keep a motor to which said valve is connected in pressure equilibrium; and means to keep said exhaust valve closed when said reversing valve is in a neutral position.

9. In a compound valve mechanism, a housing for said valve; a reversing valve rotatably mounted therein; an exhaust valve in said housing whose axis is disposed at an angle to the axis of said reversing valve; means to keep said exhaust valve normally closed; means on said reversing valve to open said exhaust valve when said reversing valve is rotated; means to lubricate said reversing valve; and means in said reversing valve to neutralize pressures on a motor which said reversing valve is controlling when said reversing valve is in a neutral position.

10. In a valve shifting mechanism; a valve body having portings adapted to be connected to conduit transmitting pressure fluid; a cylinder formed in said body whose axis is disposed at right angles to said portings; a piston slideable in said cylinder and adapted to open and close said valve; means to transmit pressure fluid from said conduit to said cylinder to reciprocate said piston; valve means to selectively admit pressure fluid to said cylinder; a handle to rotate said valve; indicating means including a cam element operatively associated with a channel in said piston fixed on a shaft supporting a pointer rotatably mounted in the wall of said valve body to inform the operator of the position of said piston; said indicating means and said handle being so coordinated as to inform the operator whether to swing said handle clockwise or counterclockwise.

11. In an indicating device for a piston valve; a valve body; a cylinder integrally associated with said valve body; a piston reciprocably mounted in said cylinder; pressure fluid means to reciprocate said piston in said cylinder; said piston having a channel therein whose axis is parallel to the longitudinal axis of said piston and a second channel within said first channel whose longitudinal axis is substantially transverse to the axis of said first channel; a shaft having an indicator thereon rotatably mounted in a wall of said valve body, said shaft having an eccentric engaging said second channel and supporting a collar that is rotatably and slideably supported in said first channel; said indicator shaft rotating as said piston is reciprocated.

12. In a piston valve; a valve body; a cylinder associated with said body; a piston slideably mounted in said cylinder; pressure fluid means to slide said piston in said cylinder; indicating means to inform of the position of said piston in said cylinder, said means including an indicating arrow fixed to a shaft rotatably mounted in a wall of said valve body; said piston having channels in the wall thereof one of which is transversely disposed to the other; and means on said shaft engaging each of said channels one of which is adapted to rotate said shaft as said piston is reciprocated in said cylinder.

13. In a valve; a valve body incorporating a cylinder; a piston slideably mounted in said cylinder and adapted to open and close said valve; pressure fluid means to slide said piston in said cylinder; signal means to indicate the open and closed position of said valve; means to actuate said signal which includes two transverse channels formed in said piston, one cut in the base of the other, a shaft means mounting said signal, and means on said shaft cooperating with each of said channels, one portion of said means engaging one of said channels to rotate said signal as said piston is reciprocated in said cylinder.

14. In a valve; a valve body having a cylinder therein; a piston reciprocably mounted in said cylinder; said valve body having a passage therethrough at right angles to said cylinder axis and adapted to transmit pressure fluid to and from conduits connected thereto; a first pair of conduits connected to each end of said valve body and communicating with said passage; said conduits being disposed one on each side of said cylinder; said first pair of conduits terminating in a reversing valve; a second pair of conduits leading from said reversing valve to opposite ends of said cylinder; valve means to throttle the exhaust of said motor; handle means to rotate said reversing valve; means to actuate said exhaust valve and said reversing valve in a timed sequence; a signal means operatively associated with said piston to indicate the closed and open position of said valve; said valve and said handle operatively associated to inform the operator which way to rotate said handle.

15. In a reversing valve mechanism; a housing for a reversing valve; a valve rotor mounted in said housing; an exhaust valve mounted in said housing whose longitudinal axis is transversely disposed with respect to the longitudinal axis of said rotor; means to rotate said rotor; and means eccentrically mounted on said rotor directly engaging said exhaust valve to actuate said exhaust valve when said rotor is rotated, said exhaust valve opening prior to the opening of said reversing valve and closing after said reversing valve is closed.

16. In a valve shifting mechanism; a valve body having a passageway adapted to transmit pressure fluid; a cylinder formed in said body whose bore intersects said passageway; a piston slideable in said cylinder adapted to open and close said passageway; means to transmit pressure fluid from said passageway to said cylinder to actuate said piston; a valve in said means to selectively admit pressure fluid to said cylinder; means to actuate said valve; means to indicate the position of said piston in said cylinder which includes a pointer and shaft element rotatably mounted in said valve body, said shaft having a collar thereon; and said piston having transversely disposed slots in the wall thereof; and said shaft having means thereon engageable in one of said slots to rotate said shaft and pointer when said piston is moved in said cylinder, said collar engageable in said second slot to support said shaft in proper alignment with said first mentioned slot.

17. In a valve organization; a valve body having a passage therethrough; a cylinder formed in said body whose longitudinal axis is transverse to the axis of said passageway; a piston in said cylinder adapted to open or close said passageway; means to reciprocate said piston in said cylinder by pressure fluid passing through said passageway and selectively applied to the ends of said cylinder; and means to indicate the position of said piston in said cylinder which includes a rotatable pointer and shaft; means on said shaft engaging channels in the wall of said piston, one of said channels rotating said pointer when said piston is reciprocated and the other channel supporting said shaft in proper alignment with respect to said first mentioned channel.

18. In a valve organization; a valve body having a passageway therethrough and a piston bore transversely disposed thereto; a piston plunger movable in said bore to open and close said passageway; a reversing valve housing fixed to said body; a rotor in said housing; conduits connecting the passageway with said housing; a reverse flow check valve in each conduit; conduits connecting said housing and said piston bore; said reversing valve rotor connecting said conduits through said housing; an exhaust valve in said housing and operable in a timed relation to said reversing valve; a manual throttle valve for the exhaust of said motor; an indicator and its shaft rotatably mounted in said valve body; said piston having two channels thereon at least one of which engages a first means on said indicator shaft to rotate said shaft when said piston is reciprocated in said bore; and a second means on said shaft engaging the second of said channels to maintain said shaft in proper alignment with respect to said first mentioned channel.

HOMER J. SHAFER.